United States Patent
Kogan et al.

(10) Patent No.: US 10,380,449 B2
(45) Date of Patent: Aug. 13, 2019

(54) ASSOCIATING A SCREENSHOT GROUP WITH A SCREEN

(71) Applicant: HEWLETT PACKARD ENTERPRISE DEVELOPMENT LP, Houston, TX (US)

(72) Inventors: Olga Kogan, Yehud (IL); Amit Levin, Yehud (IL); Ilan Shufer, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 0 days.

(21) Appl. No.: 15/336,482

(22) Filed: Oct. 27, 2016

(65) Prior Publication Data

US 2018/0121747 A1    May 3, 2018

(51) Int. Cl.
    *G06F 17/00*      (2019.01)
    *G06K 9/46*      (2006.01)
    *G06T 11/60*      (2006.01)
    *G06F 11/36*      (2006.01)

(52) U.S. Cl.
    CPC .......... *G06K 9/46* (2013.01); *G06F 11/3672* (2013.01); *G06T 11/60* (2013.01)

(58) Field of Classification Search
    CPC .................................................... G06K 9/46
    See application file for complete search history.

(56) References Cited

U.S. PATENT DOCUMENTS

| | | | |
|---|---|---|---|
| 6,562,077 B2 | 5/2003 | Bobrow et al. | |
| 7,593,961 B2* | 9/2009 | Eguchi | G06F 17/30259 |
| 8,019,588 B1* | 9/2011 | Wohlberg | G06F 11/3692 |
| | | | 703/22 |
| 8,352,465 B1* | 1/2013 | Jing | G06F 17/30867 |
| | | | 707/723 |
| 8,935,653 B2* | 1/2015 | Mazzoleni | G06Q 10/101 |
| | | | 717/100 |
| 9,251,435 B2* | 2/2016 | Danko | G06K 9/6217 |
| 9,880,994 B1* | 1/2018 | Choi | G06F 17/248 |
| 9,984,310 B2* | 5/2018 | Hoffman | G06K 9/6215 |
| 2008/0310736 A1 | 12/2008 | Chattopadhyay et al. | |
| 2011/0214107 A1 | 9/2011 | Barmeir et al. | |

(Continued)

FOREIGN PATENT DOCUMENTS

EP      1569122 A2    8/2005

OTHER PUBLICATIONS

Carmi, A., "Automated Visual Software Testing: The Missing Link in Software Test Automation," (Web Page), Sep. 16, 2013, 2 pages, available at http://testautomation.applitools.com/post/61391978387/automated-visual-software-testing-the-missing.

(Continued)

*Primary Examiner* — Amelia L Tapp

(57) ABSTRACT

A first screenshot taken from a screen and having a first layout element may be determined to meet a first layout similarity threshold with a second screenshot having a second layout element. A first group comprising the first and second screenshot may be created in response to the first screenshot meeting the first layout similarity threshold with the second screenshot and it may be determined that a first feature of the first screenshot from the first group matches a second feature of a third screenshot from a second group. The second group may then be associated with a screen in response to the match determination.

18 Claims, 5 Drawing Sheets

(56) References Cited

U.S. PATENT DOCUMENTS

2012/0272139 A1* 10/2012 Kern ................ G06F 17/30259
                715/234
2014/0189576 A1  7/2014 Carmi
2015/0347276 A1 12/2015 Hey et al.
2017/0017648 A1* 1/2017 Pearlman ................ G06K 9/46

OTHER PUBLICATIONS

Hu, J. et al., "Document Image Layout Comparison and Classification," (Research Paper), Document Analysis and Recognition, 1999, ICDAR'99, Proceedings of the Fifth International Conference on, IEEE, Jun. 2000, 5 pages, available at http://citeseerx.ist.psu.edu/viewdoc/download?doi=10.1.1.33.8552&rep=rep1&type=pdf.

OpenCV, "Feature Matching—OpenCV 3.0.0-dev Documentation," (Web Page), 5 pages, available at http://docs.opencv.org/3.0-beta/doc/py_tutorials/py_feature2d/py_matcher/py_matcher.html#basics-of-brute-force-matcher.

Rosebrock, A., "OpenCV Panorama Stitching," (Web Page), Image Descriptors, OpenCV 3, Tutorials, Jan. 11, 2016, 30 pages, available at http://www.pyimagesearch.com/2016/01/11/opencv-panorama-stitching/.

European Patent Office, "The Extended European Search Report", European Patent Application No. 17198916.3-1221; dated Mar. 9, 2018; 8 pages.

* cited by examiner

ASSOCIATING A SCREENSHOT GROUP WITH A SCREEN

BACKGROUND

User Interface (UI) testing is the process in which an interface of an application is tested to determine whether the application is functioning correctly and meeting its written specifications. Image based testing is one approach to conducting UI testing.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
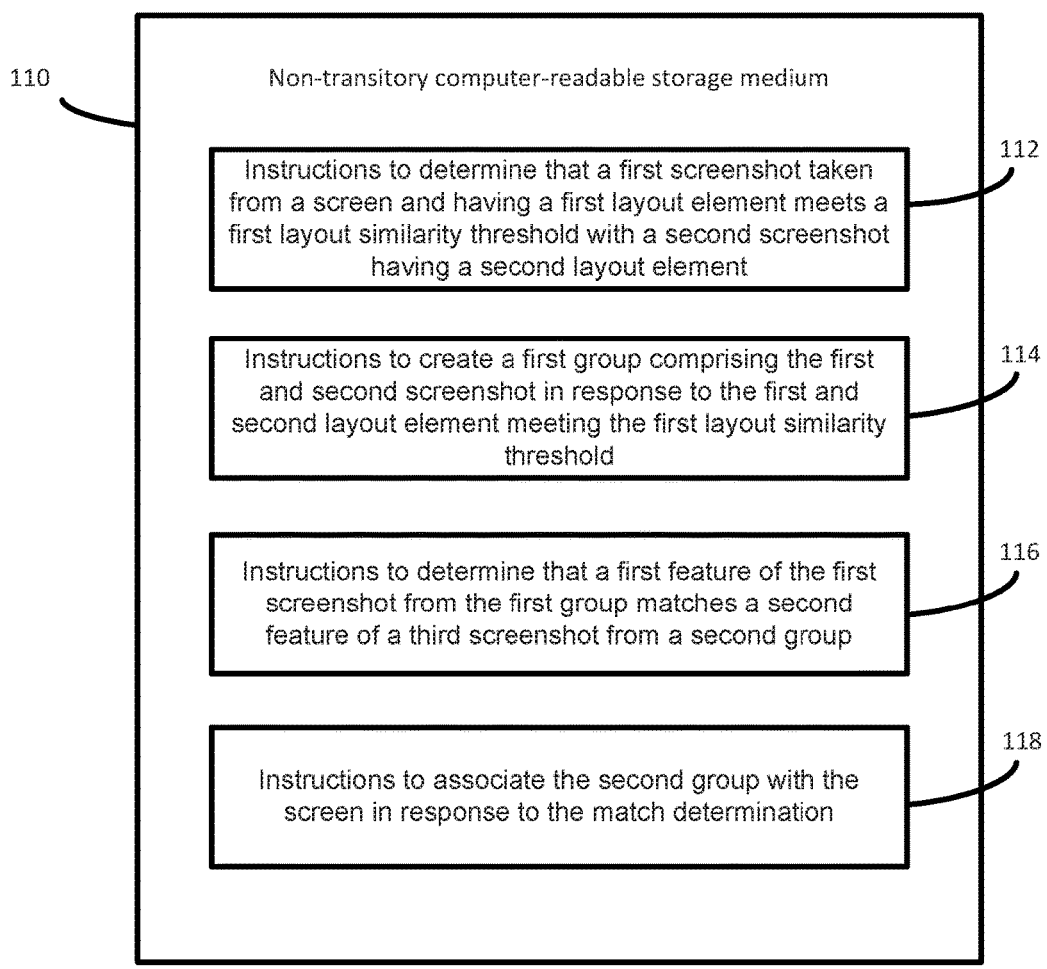
FIG. 1 is a block diagram illustrating a non-transitory computer-readable storage medium according to some examples.

Systems, methods, and equivalents for associating a screenshot are described. When conducting user interface (UI) testing, image captures of a screen, commonly known as screenshots, are utilized for image testing and analysis. Specifically, a UI tester, when testing an application, may capture screenshots of different application screens within the application. If the application screens from which screenshots were captured are known, then the screenshots may be used for identifying common user flows, providing visual transcripts of visual test recordings, or generating UI coverage reports, etc.

The dynamic nature of application screens may present a challenge for correctly associating a screenshot with the application screen from which the screenshot was captured. Application screens may be dynamic in nature due to changing content on the application screens. The content on an application screen may change due to, among other things, scrolling on the application screen, or dynamically displayed content, such as application screens displaying personalized content. Unfortunately, during the image capture process, screenshots may not be labeled or mapped to the respective application screens from which the screenshots were captured. A user may consequently have difficulty identifying which screenshots were taken from which application screens.

Various examples provided herein relate to systems and methods for associating a screenshot with the screen from which the screenshot was captured. A plurality of screenshots may be associated by grouping. Specifically, it may be determined whether a first screenshot taken from a screen and having a first layout element meets a first layout similarity threshold with a second screenshot having a second layout element. Where the first layout similarity threshold is met, a first group may be created comprising the first screenshot and the second screenshot. Subsequently, it may be determined whether a first feature of the first screenshot from the first group matches a second feature of a third screenshot from a second group. Where a match is determined, the second group may be associating with the screen. In some examples, screenshots may be associated with their respective application screens despite the dynamic nature of these application screens, while minimizing the computer processing power used to do so.

In the following description, for purposes of explanation, numerous specific details are set forth in order to provide a thorough understanding of the present systems and methods. For some examples, the present systems and methods may be practiced without these specific details. Reference in the specification to "an example" or similar language means that a particular feature, structure, or characteristic described in connection with that example is included as described, but may not be included in other examples. In other instances, methods and structures may not be described in detail to avoid unnecessarily obscuring the description of the examples. Also, the examples may be used in combination with each other.

The following terminology is understood to mean the following when recited by the specification or the claims. The singular forms "a," "an," and "the" mean "one or more." The terms "including" and "having" are intended to have the same inclusive meaning as the term "comprising."

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

FIG. 1 illustrates a block diagram of an example non-transitory computer-readable storage medium 110 for associating a screenshot with a screen. The non-transitory computer readable storage medium 110 may include instructions 112 executable by a processor to determine that a first screenshot taken from a screen and having a first layout element meets a first layout similarity threshold with a second screenshot having a second layout element. In one instance, the layout element of the first screenshot, which may be determined to be the boundaries containing a point on the first screenshot, is compared to the layout element of the second screenshot, which may define the boundaries containing a point on the second screenshot. Through comparison of the first layout element with the second layout element, it may be determined whether the first screenshot meets the first layout similarity threshold with the second screenshot.

The non-transitory computer readable storage medium 110 may include instructions 114 executable by a processor to create a first group comprising the first screenshot and the second screenshot in response to the first screenshot meeting the first layout similarity threshold with the second screenshot. The non-transitory computer readable storage medium 110 may also include instructions 116 executable by a processor to determine that a first feature of the first screenshot from the first group matches a second feature of a third screenshot from a second group. The feature similarity threshold may be based on a similarity between features such as, among other things, a point, edge, corner, curve, boundary, contour, connected region, or other object such as a graphical or textual object of the first screenshot as compared to features of the third screenshot. The feature similarity threshold may also be based on a predetermined number of matching features between the first screenshot and the third screenshot. In other examples, the feature similarity threshold may be based on a predetermined percentage of features matching between the first screenshot and the third screenshot or a ratio of matching features to mismatching features between the first screenshot and the third screenshot.

A screenshot is an image captured from a screen in a particular state, and in one instance, may be an image captured from an application screen, such as from a mobile application, web based application, etc. The application may be run on any computing device having a user interface, such as a mobile device. The non-transitory computer readable storage medium 110 may include instructions 118 executable by a processor to associate the second group with a screen in response to the match determination. In one example, the instructions 118 executable by a processor to associate the second group with a screen also cause the processor to associate the second group such that the screenshots comprising the second group can be identified as having been captured from the screen. In another example, the instructions 118 executable by a processor to associate the second group with a screen also cause the processor to associate the second group with the screen such that the second group is associated with the first group. Where the first group is associated with a screen, the second group is associated with the screen through association with the first group. In one example, this association occurs through unification of the second group with the first group into a single group.

Figure 2:
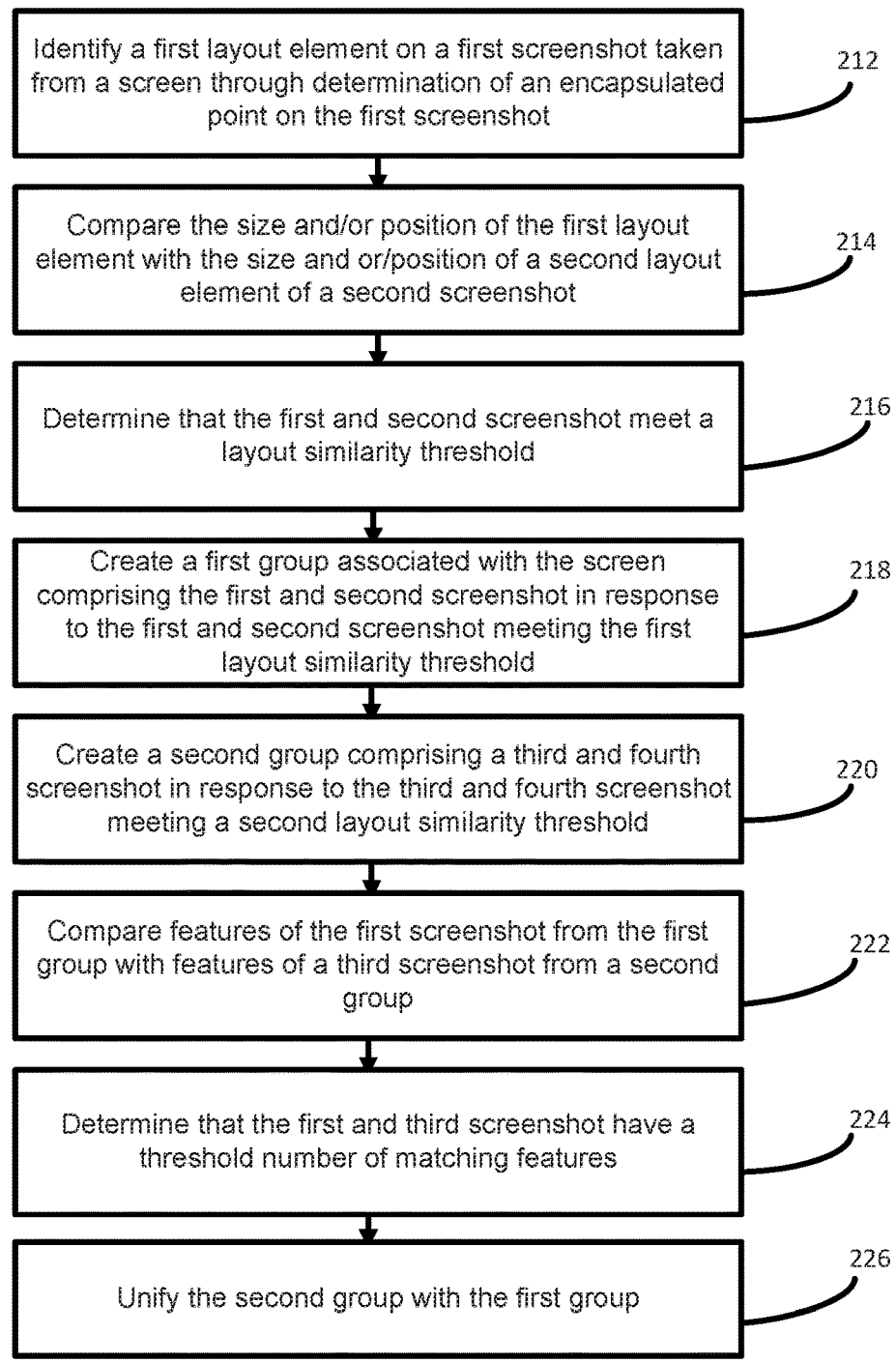
FIG. 2 is a flowchart illustrating a method according to some examples.

FIG. 2 is a flowchart 200 illustrating an example method for associating a screenshot. The method may be implemented in the form of executable instructions stored on a computer-readable medium or in the form of electronic circuitry. For example, the method 200 may be implemented by the instructions executable by the processor of the non-transitory computer-readable medium illustrated in FIG. 1 or by the processor of FIG. 4 executing the instructions of the system memory. The sequence of operations described in connection with FIG. 2 is not intended to be limiting, and an implementation consistent with the example of FIG. 2 may be performed in a different order than the example illustrated. Additionally, operations may be added or removed from the method 200.

At block 212, a first layout element on a first screenshot is identified through determination of an encapsulated point on the first screenshot. In one example, the first layout element encapsulates the point such that the layout element defines the boundaries containing the point. In one example, the boundaries may fully enclose the encapsulated point, or the boundaries may be open. The point on the screenshot may comprise a select area at a particular location of the first screenshot. In one example, the first layout element is not encapsulated by any other layout element on the first screenshot. Additionally, a layout element may take many forms, such as different colors and/or shapes surrounding the point on the first screenshot.

Any number of layout elements on the first screenshot may be identified. For example, a second layout element may be identified on the first screenshot through detection of a second encapsulated point on the first screenshot. In one example, this second encapsulated point is at a different location than the first encapsulated point such that the second encapsulated point is not encapsulated by the first layout element. In one example, neither the first or second identified layout element is encapsulated by a layout element of the first screenshot.

Figure 3:
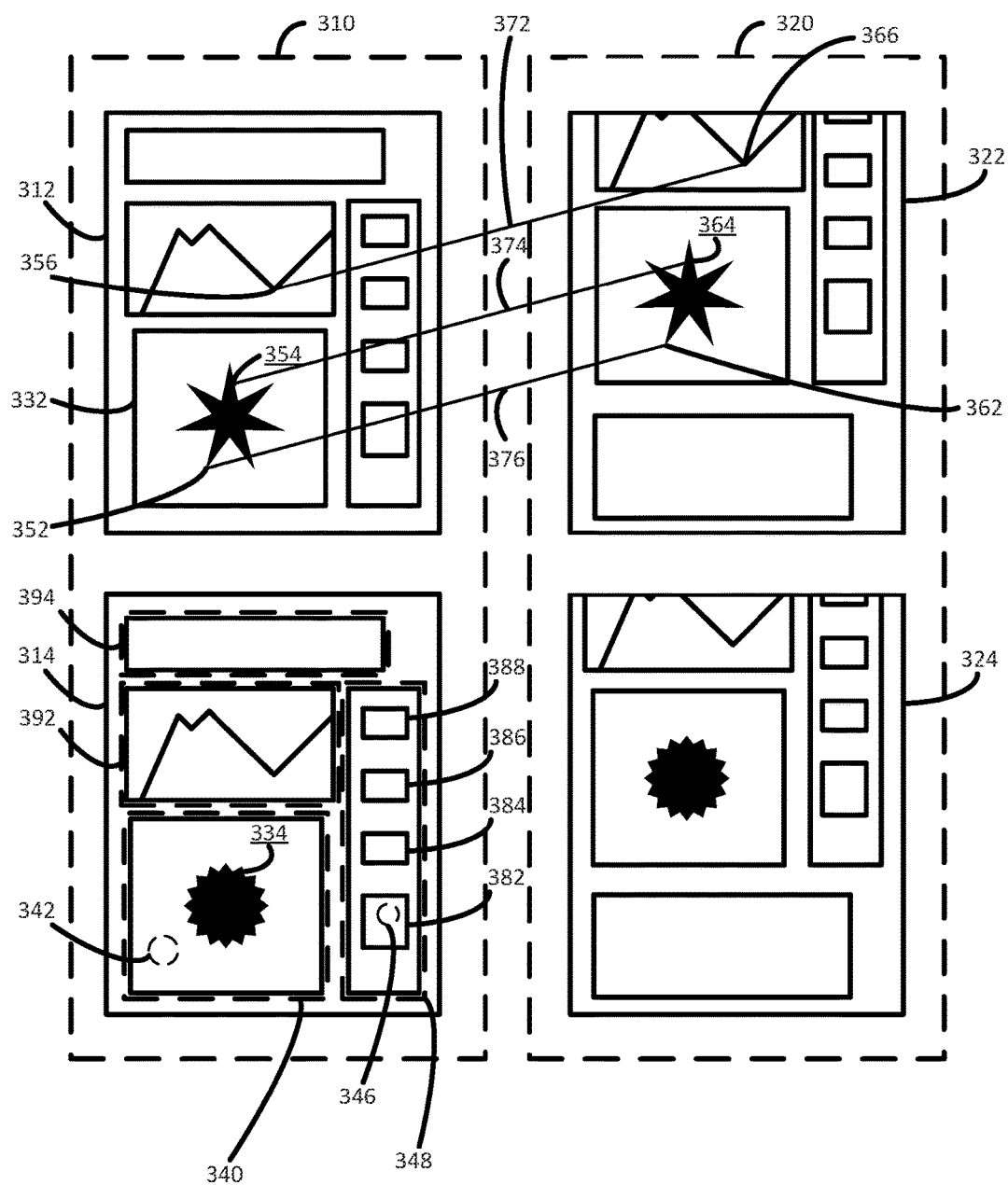
FIG. 3 is a block diagram illustrating feature matching screenshots grouped by layout similarity according to some examples.

Turning to FIG. 3, examples of identified layout elements on a screenshot are illustrated. FIG. 3 illustrates a first group 310 comprising screenshots 312 and 314 and a second group comprising screenshots 322 and 324. Screenshot 312 includes example features 352, 354, and 356 and screenshot 322 includes example features 362, 364, and 366. Screenshot 314 includes example feature 334 and identified layout elements 340, 348, 392, and 394. Additionally, screenshot 314 includes example points 342 and 346.

Layout element 340 may define the boundaries surrounding point 342. While point 342 is illustrated as a particular area, the point may be of any size covering any particular area encapsulated by layout element 340. Points 342 and 346 are shown in dashed lines to illustrate that points 342 and 346 are not depicted within screenshot 314 but rather are target areas for analysis for the purpose of layout element identification. Accordingly, through image analysis of a particular area of a screenshot, e.g. point 342, a layout element encapsulating that point, e.g. layout element 340, may be identified. While a layout element may take any number of forms, such as different colors and/or shapes, layout elements 340, 348, 392, and 394 are shown in rectangles with dashed lines to illustrate that layout elements 340, 348, 392, and 394 may be overlaid on screenshot 314 for purposes of layout element analysis and may not be depicted within screenshot 314.

In one example, layout elements encapsulated by any larger layout element on the screenshot are not identified. For instance, layout element 382 is illustrated as encapsulating point 346. In this example, because layout element 382 is encapsulated by a larger layout element of the screenshot, in this case layout element 348, layout element 382 is not identified. Conversely, layout element 348 encapsulates point 346 and is not encapsulated by any larger layout element of screenshot 314. In this example, layout element 348, unlike layout element 382, is thus identified as a layout element encapsulating point 346. Like layout element 382, layout elements 384, 386, and 388 are additional example layout elements that may not be identified because they are encapsulated by layout element 348.

Where multiple points of a particular size are utilized such that a plurality of points, e.g. an array, collectively covers a full area of a screenshot, a layout of the screenshot may be identified. The layout may include each identified layout element surrounding each point on the screenshot. In one example, each layout element included in the layout is not encapsulated by any other layout element. A filtering algorithm for instance, may remove any layout element encapsulated by any other layout element on the screenshot. This example is illustrated in FIG. 3, in which a plurality of points, e.g. points 342 and 346, are encapsulated by identified layout elements 340 and 348 respectively. Layout elements 340, 348, 392, and 394 collectively form an example layout of screenshot 314. As illustrated in this example, layout elements 340 and 348, 392, and 394 are not encapsulated by a layout element of screenshot 314.

Prior to identification of the first layout element, a screenshot may be processed in preparation for image analysis. For example, screenshot 314 may be converted to a gray-scaled image, and the contrast of screenshot 314 may be adjusted to increase the prominence of layout elements within the screenshot. Additionally, screenshot 314 may be smoothed or blurred so as to reduce image noise or minor details. Text for example, may also be blurred to assist in layout element determination.

Turning back now to FIG. 2, at block 214 the identified first layout element of the first screenshot is compared to a second layout element of a second screenshot. Any number of methods may be implemented to compare the similarity between the first layout element and the second layout element. In one example, the size and/or position of the first layout element relative to the first screenshot is compared to the size and/or position of the second layout element relative to the second screenshot. The layout elements may also be compared based on their relative shape or orientation. The examples presented are merely illustrative and other methods may be implemented to compare the similarity between layout elements.

The comparison at block 214 can be applied to the example screenshots illustrated in FIG. 3. For instance, identified layout element 340 of screenshot 314 may be compared to respective layout element 332 of screenshot 312. The relative position of layout element 340 may be compared with the relative position of layout element 332. For instance, layout element 340, being located in the bottom half of screenshot 314, may be compared to the relative position of layout element 332, located in the bottom half of screenshot 312. Other characteristics of layout element 340 may also be compared to layout element 332, which may include but is not limited to, relative size, shape, orientation, etc.

Any number of layout elements of the first screenshot may be compared to any number of respective layout elements of the second screenshot. The identified layout elements of a screenshot, considered as a whole, may form a layout of the screenshot. In one example, each identified layout element of the first screenshot is compared to each respective layout element of the second screenshot. Thus, the layout of one screenshot may be compared to that of another screenshot.

Turning back to FIG. 2, the method as described at block 216 includes determining whether the first layout element of the first screenshot meets a first layout similarity threshold with a second layout element of a second screenshot. The first layout similarity threshold may be determined based on predetermined similarity criteria. For example, the predetermined similarity criteria may be based on any combination of the various aspects for similarity comparison as detailed above, such as size, shape, orientation, etc. Where a plurality of layout elements of the first screenshot are compared to a plurality of layout elements of the second screenshot, the threshold may be determined based on predetermined similarity criteria measured between the screenshot layout elements collectively. For instance, the layout similarity threshold may be a number or percentage of layout elements of the first screenshot and the second screenshot matching. In yet another example, the layout similarity threshold may be a number of mismatching layout elements such that the layout similarity threshold is not met where the layout element comparison exceeds a predetermined number of mismatching layout elements.

If the first layout similarity threshold is met, a first group is created, as illustrated at block 218. In one example, the first group is associated with the screen from which the first screenshot was captured upon creation. The first group may comprise screenshots that meet the first layout similarity threshold, such as the first and second screenshot. In one example, a representative screenshot is selected from the first group and the representative screenshot may be compared to additional screenshots not in the first group. If any additional screenshot is determined to meet the first layout similarity threshold with the representative screenshot of the first group the additional screenshot may be added to the first group. In one example, the first group may include screenshots having met the first layout similarity threshold but may not include screenshots that do not meet the first layout similarity threshold.

As illustrated as one example at block 220, a second group comprising a third and fourth screenshot may be created. This second group may be created in response to a third and fourth layout element meeting a second layout similarity threshold. Although a first and second group are created in the example of FIG. 2, any number of groups may be created. In this way, a plurality of screenshots may be grouped by layout similarity.

FIG. 3 illustrates screenshots grouped by layout similarity. Specifically, a first group 310, comprising screenshots 312 and 314, and a second group 320, comprising screenshots 322 and 324 are illustrated. These screenshots are examples of images captured from an application screen. In one example, screenshots may not share similar features to meet a layout similarity threshold. For example, feature 334 of screenshot 314 is different than feature 354 of screenshot 312, yet screenshot 314 and screenshot 312 both are grouped within group 310. In one example, screenshots 312, 314, 322, and 324 are all screenshots taken from the same application screen.

As an illustrative example, screenshots 312 and 314 are grouped within a first group for meeting a first layout similarity threshold, and screenshots 322 and 324 are grouped within a second group for meeting a second layout similarity threshold. In one example, the second layout similarity threshold is different than the first layout similarity threshold. In this example, screenshots 312 and 314 do not share a layout similarity threshold with screenshots 322 and 324 because screenshots 322 and 324 are examples of screenshots taken from a different portion of a screen than screenshots 312 and 314, e.g. due to scrolling by a user such that the layout elements of screenshots 312 and 314 have experienced a translation relative to the layout elements of screenshots 322 and 324, or due to different captured portions of a screen that could not otherwise be captured in a single screenshot.

Turning back to FIG. 2, at block 222, features of the first screenshot from the first group are compared to respective features of the third screenshot from the second group. A feature is a location of interest within an image. Specifically, a feature is a subset of an image domain, which may take the form of a point, edge, corner, curve, boundary, connected region, graphical or textual object. This list is merely an example and not comprehensive, and a feature may exist in any number of forms not listed.

Where there are more than two groups, the features of the first screenshot from the first group may be compared to the respective features of screenshots from each of the other groups. In one example, the features of a screenshot representative of each of the groups formed according to layout similarity may be compared. For instance, the features of a representative screenshot from a first group meeting a first layout similarity threshold with a second screenshot from the first group may be compared to the features of a representative screenshot from any number of other groups. In this way, representative screenshots of groups, but not other screenshots of groups, may be subjected to inter-group comparisons of features.

FIG. 3 illustrates an example for determining that there are a threshold number of matching features between a screenshot from a first group and a screenshot from a second group. FIG. 3 illustrates example features 352, 354, and 356 of screenshot 312 and example features 362, 364, and 366 of screenshot 322 of the second group. Example features 352, 354, and 356 may be identified features of screenshot 312. Similarly, example features 362, 364, and 366 may be identified features of screenshot 322. The example features of FIG. 3 are by no means exhaustive, as any number of additional features may exist within the example screenshots. However, for purposes of clarity and conciseness a select few example features were selected for explanation.

Features 352, 354, and 356 of screenshot 312 of the first group 310 may be compared to features 362, 364, and 366 of screenshot 322 of the second group 320 respectively. A variety of methods may be utilized to match the similarities between features of screenshot 312 to features of 322. For example, screenshot 312 and screenshot 314 may be physically juxtaposed such that a line, e.g. lines 372, 374, and 376 may be drawn between features having similar characteristics. Various characteristics of lines 372, 374, and 376 may be analyzed for purposes of feature comparison. For example, the parallel nature of lines 372, 374, and 376 may be analyzed, or the ratio between the distances of lines 372, 374, and 376 may be analyzed such that it may be determined whether screenshot 312 of the first group meets a feature similarity threshold with screenshot 322 of the second group.

In another example, features of a screenshot from group 310 may be matched to features of a screenshot from group 320 through analysis of a like translation length between respective features. Specifically, a translation length may be determined through comparison of features 352 and 362, the translation length being the respective distance for which feature 362 is translated on screenshot 322 relative to feature 352 on screenshot 312. Similarly, a translation length may be determined through comparison of features 354 and 364, the translation length being the respective distance for which feature 364 is translated on screenshot 322 relative to feature 362 on screenshot 312. In one example, the translation length determined through comparison of features 352 and 362 is compared to the translation length determined through comparison of features 354 and 364. Group 320 may be associated with group 310 where the translation lengths are equal in length. In another example, group 320 may be associated with a screen, e.g. the screen from which a screenshot from group 310 was taken, where the translation lengths are equal in length.

In other examples, the characteristics of features of a screenshot from group 310 may be compared to the characteristics of features of a screenshot from group 320. For instance, the orientation, size, shape, relative position, smoothness, gradient value, or any number of other characteristics of features of a screenshot may be used for comparing the similarity of features.

Turning back to FIG. 2, it is determined at block 224 that the first screenshot of the first group and the third screenshot from the second group have a threshold number of matching features. This threshold may be determined based on predetermined similarity criteria. Where a plurality of features of the first screenshot from the first group are compared to a plurality of features of the third screenshot from the second group, the threshold may be determined based on the similarity between the respective features collectively. For example, the predetermined similarity criteria may be based on a predetermined number of matching features between the first screenshot and the third screenshot. The predetermined similarity criteria may also be based on a predetermined percentage of features matching between the first screenshot and the third screenshot, a ratio of matching features to mismatching features between the first screenshot and the third screenshot, etc. Thus, in some examples the first and third screenshot may meet the predetermined threshold even where some features of the first screenshot may not match respective features of the third screenshot.

If it is determined that the first screenshot and third screenshot meet the predetermined similarity criteria, the second group may be associated with the first group. Block 226 is an example of such an association, in which the second group is unified with the first group. In this example, the screenshots comprising the first group and the screenshots comprising the second group form a single group. In one example, the first group may be associated with the screen such that the second group is associated with the screen through association with the first group. In other examples, one of the first, or one of the second group is associated with the screen. Accordingly, screenshots taken from the same screen may be grouped and associated with the screen from which they were captured.

FIG. 2 illustrates an example where the first and second layout elements are determined to meet a layout similarity threshold and where the first and third screenshot are determined to have a threshold number of matching features. In some examples, however, it may be determined that either threshold is not met. For example, where it is determined that the first layout element of the first screenshot and the second layout element of the second screenshot do not meet a layout similarity threshold, a first group comprising the first and second screenshot may not be formed. Similarly, where it is determined that the first screenshot of the first group and the third screenshot of the second group do not have a threshold number of matching features, the second group may not be unified with the first group.

Figure 4:
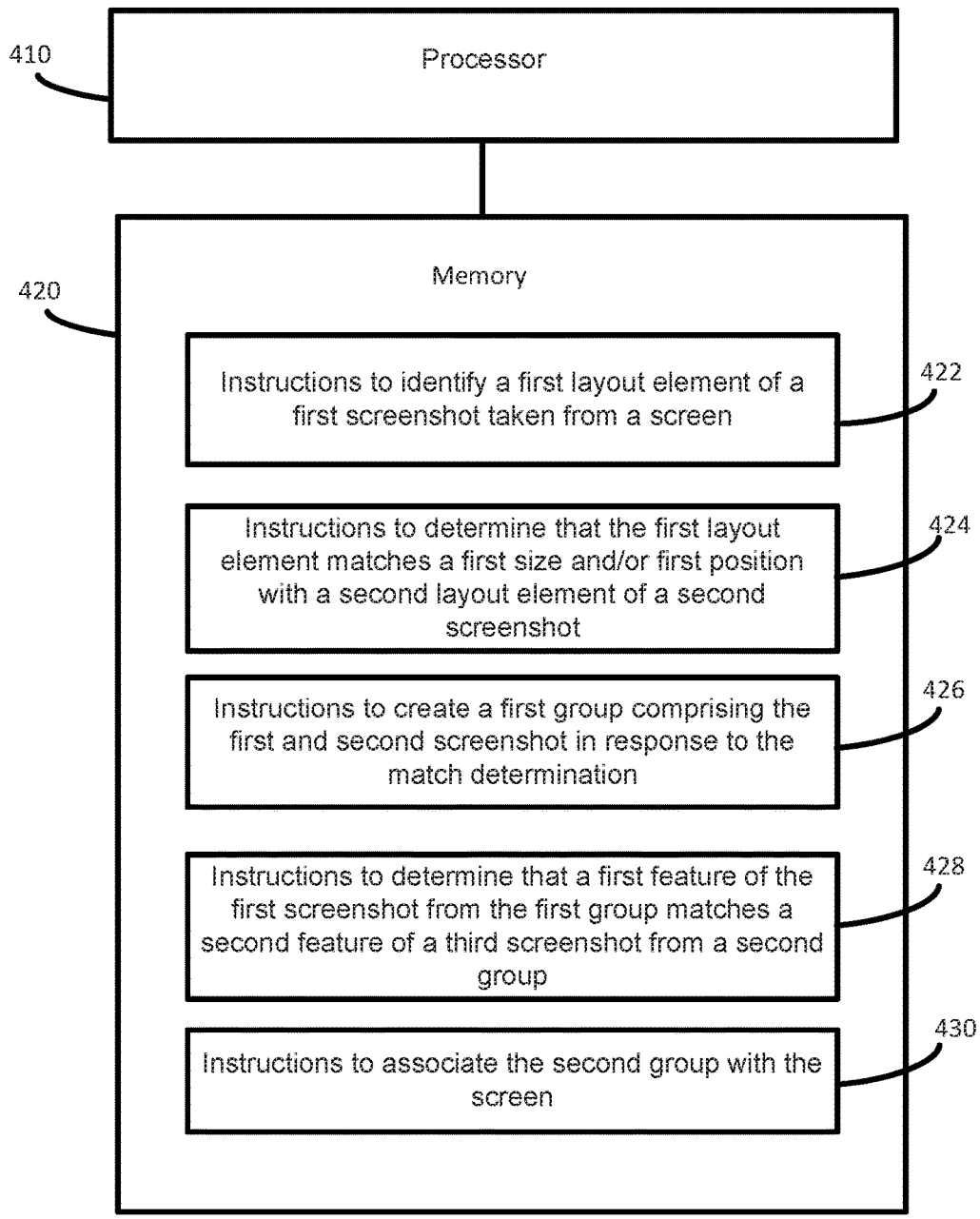
FIG. 4 is a block diagram illustrating a system according to some examples.

FIG. 4. is a block diagram illustrating system 400 according to some examples. The system 400 may include a processor 410 and a memory 420. The memory 420 may include instructions 422 executable by the processor to identify a first layout element of a first screenshot taken from a screen, the first layout element comprising a first encapsulation of a point on the first screenshot. The memory 420 may include instructions 424 executable by the processor to determine that the first layout element of the first screenshot matches a first size or a first position with a second layout element of a second screenshot. The memory 420 may also include instructions 426 executable by a processor to create a first group comprising the first screenshot and the second screenshot in response to the match determination. Furthermore, the memory 420 may include instructions 428 executable by a processor to determine that the first screenshot from the first group matches a second feature of a third screenshot from a second group. The memory 420 may also include instructions 430 executable by a processor to associate the second group with the screen in response to the match determination.

Figure 5:
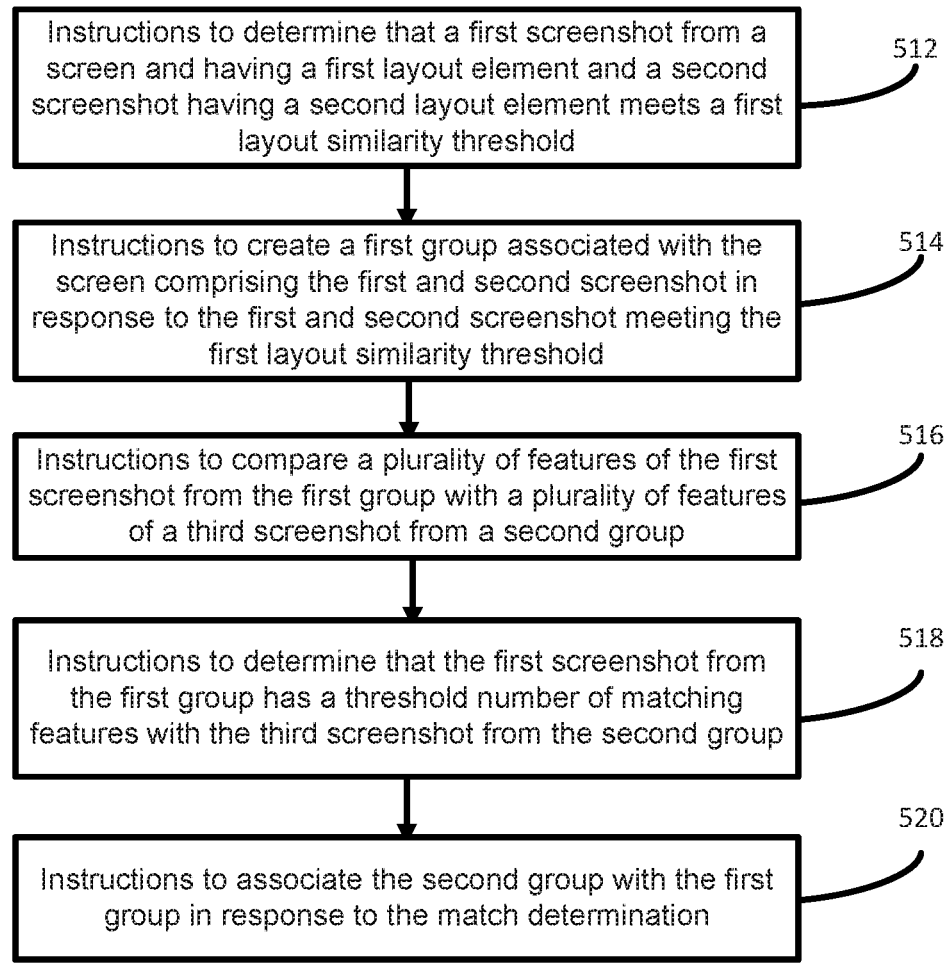
FIG. 5 is a flowchart illustrating a method for associating a group of screenshots according to some examples.

FIG. 5 is a flow chart illustrating an example method 500 for associating a screenshot. The method 500 may be implemented in various forms, including in the form of executable instructions stored on a computer-readable medium or in the form of electronic circuitry. For example, the method 500 may be implemented by the instructions executable by the processor of the non-transitory computer-readable medium illustrated in FIG. 1 or by the processor of FIG. 4 executing the instructions of the system memory. The sequence of operations described in connection with FIG. 5 is not intended to be limiting, and an implementation consistent with the example of FIG. 5 may be performed in a different order than the example illustrated.

In FIG. 5, the method begins at block 512, where it is determined that a first layout element of a first screenshot taken from a screen meets a first layout similarity threshold with a second layout element of a second screenshot. At block 514, a first group is created comprising the first screenshot and the second screenshot in response to the first layout element meeting the first layout similarity threshold with the second layout element. At block 516, a plurality of features of the first screenshot from the first group are compared with a plurality of features of a third screenshot from a second group. At block 518, the first screenshot from the first group is determined to have a threshold number of matching features with the third screenshot from the second group. At block 520, the second group is associated with the first group in response to the match determination.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

What is claimed is:

1. A non-transitory computer-readable storage medium comprising instructions executable by a processor to:
   determine that a first screenshot taken from a screen and having a first layout element meets a first layout similarity threshold with a second screenshot having a second layout element;
   create a first group comprising the first screenshot and the second screenshot in response to the first screenshot meeting the first layout similarity threshold with the second screenshot;
   determine that a first feature of the first screenshot from the first group matches a second feature of a third screenshot from a second group; and
   associate the second group with the screen in response to the match determination,
   wherein the third screenshot has a third layout element and does not meet the first layout similarity threshold with the first screenshot due to a first translation of the third layout element relative to the first layout element.

2. The non-transitory computer-readable storage medium of claim 1, further comprising instructions executable by the processor to identify the first layout element through determination of an encapsulated point on the first screenshot.

3. The non-transitory computer-readable storage medium of claim 2, wherein the first layout element of the first screenshot is encapsulated by no other layout element of the first screenshot.

4. The non-transitory computer-readable storage medium of claim 3, further comprising identifying a layout of the first screenshot, the layout comprising a plurality of layout elements of the first screenshot identified through a plurality of encapsulated points on the first screenshot, each of the plurality of layout elements encapsulated by no other layout element of the first screenshot.

5. The non-transitory computer-readable storage medium of claim 1, wherein associating the second group with the screen comprises associating the second group with the first group.

6. The non-transitory computer-readable storage medium of claim 5, wherein associating the second group with the first group comprises unifying the second group and the first group into a single group.

7. The non-transitory computer-readable storage medium of claim 1, wherein the third screenshot meets a second layout similarity threshold with a fourth screenshot of the second group, wherein the second layout similarity threshold has a same or different value relative to the first layout similarity threshold.

8. The non-transitory computer-readable storage medium of claim 1, wherein the instructions to determine that the first feature of the first screenshot matches the second feature of the third screenshot from the second group comprises instructions executable by the processor to:
   compare the first feature of the first screenshot from the first group with the second feature of the third screenshot from the second group and a third feature of the first screenshot with a fourth feature of the third screenshot, wherein the second feature is translated by a first translation length in the third screenshot relative to the first feature in the first screenshot, and wherein the fourth feature is translated by a second translation length in the third screenshot relative to the third feature in the first screenshot, the second translation length being equal to the first translation length.

9. The non-transitory computer-readable storage medium of claim 8, wherein the instructions to associate the second group with the screen comprise instructions to associate the second group with the screen based on the first translation length being equal to the second translation length.

10. The non-transitory computer-readable storage medium of claim 1, wherein the instructions to determine that the first feature of the first screenshot matches with the second feature of the third screenshot comprises instructions executable by the processor to determine that a plurality of features of the first screenshot reach a threshold number of matching features with a plurality of features of the second screenshot.

11. The non-transitory computer-readable storage medium of claim 1, wherein the instructions to determine that the first screenshot meets the first layout similarity threshold with the second screenshot comprise instructions to match a size of the first layout element of the first screenshot with the second layout element of the second screenshot.

12. The non-transitory computer-readable storage medium of claim 1, wherein the instructions to determine that the first screenshot meets the first layout similarity threshold with the second screenshot comprise instructions to match a position of the first layout element of the first screenshot with the second layout element of the second screenshot.

13. A method comprising:
by a processor:
  determining that a first screenshot taken from a screen and having a first layout element meets a first layout similarity threshold with a second screenshot having a second layout element;
  creating a first group associated with the screen comprising the first screenshot and the second screenshot in response to the first screenshot meeting the first layout similarity threshold with the second screenshot;
  comparing a plurality of features of the first screenshot from the first group with a plurality of features of a third screenshot from a second group, including:
    comparing the first feature of the first screenshot from the first group with the second feature of the third screenshot from the second group and a third feature of the first screenshot with a fourth feature of the third screenshot, wherein the second feature is translated by a first translation length in the third screenshot relative to the first feature in the first screenshot, and wherein the fourth feature is translated by a second translation length in the third screenshot relative to the third feature in the first screenshot, the second translation length being equal to the first translation length;
  determining that the first screenshot from the first group has a threshold number of matching features with the third screenshot from the second group; and
  associating the second group with the first group in response to the match determination.

14. The method of claim 13, wherein associating the second group with the first group comprises unifying the second group with the first group into a single group.

15. The method of claim 13, further comprising identifying the first layout element through determination of an encapsulated point on the first screenshot.

16. The method of claim 15, wherein the first layout element of the first screenshot is encapsulated by no other layout element of the first screenshot.

17. A system comprising:
a processor; and
a memory comprising instructions executable by the processor to:
  identify a first layout element of a first screenshot taken from a screen, the first layout element comprising a first encapsulation of a point on the first screenshot;
  determine that the first layout element of the first screenshot meets a first layout similarity threshold with a second layout element of a second screenshot;
  create a first group comprising the first screenshot and the second screenshot in response to the first layout element of the first screenshot meeting the first layout similarity threshold with the second layout element of the second screenshot;
  determine that a first feature of the first screenshot from the first group matches a second feature of a third screenshot from a second group; and
  associate the second group with the screen in response to the match determination,
wherein the third screenshot has a third layout element and does not meet the first layout similarity threshold with the first screenshot due to a first translation of the third layout element relative to the first layout element.

18. The system of claim 17, wherein the first layout element of the first screenshot is encapsulated by no other layout element of the first screenshot.

* * * * *